United States Patent [19]

Selesnick

[11] Patent Number: 4,759,845

[45] Date of Patent: Jul. 26, 1988

[54] PLURAL FILTER APPARATUS WITH FILTRATION GASKET

[76] Inventor: Michael Selesnick, In & Out Farm, 258 Durham Rd., Newtown, Pa. 18940

[21] Appl. No.: 110,911

[22] Filed: Oct. 21, 1987

[51] Int. Cl.⁴ .............................. B01D 25/02
[52] U.S. Cl. ...................... 210/316; 210/450; 210/488; 55/485; 55/502
[58] Field of Search ............... 210/314, 316, 318, 450, 210/459, 488, 489, 492, 496; 55/484, 485, 486, 488, 489, 493, 502, 505, 507

[56] References Cited

U.S. PATENT DOCUMENTS

| | | | |
|---|---|---|---|
| 2,550,070 | 4/1951 | La Brecque et al. | 29/148 |
| 3,064,819 | 11/1962 | Jones | 210/266 |
| 3,199,679 | 8/1965 | Salyer, Jr. | 210/259 |
| 3,228,529 | 1/1966 | Gillick, Jr. et al. | 210/488 |
| 3,592,766 | 7/1971 | Kudlaty | 210/232 |
| 3,857,688 | 12/1974 | Wisnewski | 55/483 |
| 4,061,576 | 12/1977 | Helgert et al. | 210/437 |
| 4,105,562 | 8/1978 | Kaplan et al. | 210/232 |
| 4,170,556 | 10/1979 | Pall | 210/181 |
| 4,171,963 | 10/1979 | Schuler | 55/302 |
| 4,266,412 | 5/1981 | Merenda | 210/167 |
| 4,267,039 | 5/1981 | Ryan | 210/193 |
| 4,292,174 | 9/1981 | Smith et al. | 210/167 |
| 4,559,138 | 12/1985 | Harms, II | 210/316 |
| 4,609,465 | 9/1986 | Miller | 210/323.2 |
| 4,664,812 | 5/1987 | Klein | 210/488 |
| 4,673,420 | 6/1987 | Haker et al. | 55/179 |

Primary Examiner—Richard V. Fisher
Assistant Examiner—Wanda L. Millard
Attorney, Agent, or Firm—Sperry, Zoda & Kane

[57] ABSTRACT

A fluid filtration apparatus is disclosed particularly usable with a perforate tubular fluid conduit as normally used for filtration of cleaning fluids and the like wherein the filtration apparatus includes a plurality of filter elements being generally cylindrical and defining a central channel therethrough to be adapted to receive the fluid conduit extending therebetween. Also included are a plurality of gasket assemblies positionable between adjacent filter elements to minimize passage of cleaning fluid therethrough to facilitate cleansing of the fluid. An outer retainer is utilized for compressing the individual filter element against the filter gaskets in such a manner as to provide a continuous filtration media along the entire length of the tubular fluid conduit and to prevent outlets for fluid emanating therefrom without passage through filtration media.

14 Claims, 1 Drawing Sheet

PLURAL FILTER APPARATUS WITH FILTRATION GASKET

BACKGROUND OF THE INVENTION

1. Field Of The Invention

The present invention deals with the field of filtration of fluids and more particularly filtration of liquids such as cleaning fluids commonly utilized in the cleaning of garments. Such fluids can be expensive and bulky in such a manner as to make the feasibility of cleaning of such fluids and re-use thereof extremely attractive. For this reason the present invention provides a novel means for filtration of such fluids with commonly available fluid outlets such as a tubular perforate fluid conduit.

2. Description Of The Prior Art

Many prior art devices are utilized for filtering products and specifically filtering of products coming from tubular conduits such as U.S. Pat. Nos. 2,550,070 patented Apr. 24, 1951 to T. A. LaBrecque et al on a Method Of Making Filter Units; 3,064,819 patented Nov. 20, 1962 to E. Jones on a Refrigerant Drier; 3,199,679 patented Aug. 10, 1965 to B. M. Salyer, Jr. on a Filter System For Dry Cleaning Solvents; 3,592,766 patented July 13, 1971 to W. J. Kudlaty on a Separable Filter Element Assembly; 3,875,688 patented Dec. 31, 1974 to J. P. Wisnewski on a Lead Filter; 4,061,576 patented Dec. 6, 1977 on a Inline Oil Filter Assembly; 4,105,562 patented Aug. 8, 1978 to S. Kaplan et al on a Filtering Apparatus With Modular Filter Elements; 4,170,556 patented Oct. 9, 1979 to D. Pall on Filter Elements And Filter Assemblies With Thermal Seal; 4,171,963 patented Oct. 23, 1979 to F. Schuler on a Filter Element Support Member; 4,266,412 patented May 12, 1981 to R. Merenda on a Filtering Device For Dry Cleaning; 4,267,039 patented May 12, 1981 to L. Ryan on a Fluid Filtration Method And Apparatus; 4,292,174 patented Sept. 29, 1981 to J. Smith et al on a Filter And Cooling Apparatus For Dry-Cleaning Systems; 4,559,138 patented Dec. 17, 1985 to J. Harms on End Connected Filter Cartridges; 4,609,465 patented Sept. 2, 1986 to J. Miller on a Filter Cartridge With A Connector Seal; and 4,673,420 patented June 16, 1987 to L. Haker et al on a Desiccant Dryer.

SUMMARY OF THE INVENTION

The present invention provides a fluid filtration apparatus which is particularly usable with perforate fluid conduits which extend outwardly from an adjacent wall area. The present invention includes a plurality of individual filter elements being generally cylindrical and formed of filtration media. These filter elements will preferably define a central channel extending therethrough which itself preferably is also generally cylindrical.

The central channels are adapted to receive the fluid conduit therein. Such fluid conduits are often tubular. In this manner it is preferable that the central channel is somewhat larger than the fluid conduit in such a manner as to define an intervening space therebetween which may be annular if the fluid conduit is tubular and the central channel is cylindrical.

An inner filter element is positioned about the fluid conduit and is located adjacent to the wall area. An outer filter element of similar construction is positioned about the fluid conduit and is located adjacent to the outer end thereof. At least one intermediate filter element will be positioned about the fluid conduit and wil be located between the inner filter element and the outer filter element. A number of intermediate filter elements will vary depending upon the length of the individual elements and the length of the perforate fluid conduit.

A plurality of gaskets may be positioned adjacent to the filter elements to prevent bypassing flow of fluid adjacent the filter elements. Each of these gaskets include a filtration flange defining a central hole adapted to receive the fluid conduit extending therethrough. Also each gasket will include a spacing means secured with respect to the filtration flange. This spacing means will define a central aperture therein in registration with respect to the central hole of the filtration flange in order to be adapted to receive the fluid conduit extending therethrough. The central hole and the central aperture together define a single central opening which will generally be between 1 inch and 2½ inches in diameter. Preferably the intervening space defined between the fluid conduit and the filter element will be larger than the spacing means to allow the spacing means to extend therein and to allow the filter elements to be snugly positioned about the spacing means. In this manner the filter elements themselves will be maintained in spaced relation with respect to the fluid conduit to facilitate the definition of a plenum chamber therein to equally distribute filtration fluid along the filters to maximize the efficiency of cleansing thereof.

The gasket means may include an inner gasket member positioned between the inner filter element and the adjacent wall area with the central opening thereof positioned about the fluid conduit. The inner gasket member may include an inner filtration flange in abutment with respect to the adjacent wall area and an inner spacing means positioned within the intervening space of the inner filter element to maintain the inner filter in spaced relation with respect to the fluid conduit.

An outer gasket member may be positioned outside the outer filter element with the central opening thereof positioned about the fluid conduit. This outer gasket member will include an outer spacer positioned within the intervening space of the outer filter element to maintain the outer filter in spaced relation with respect to the fluid conduit. Also an outer filtration flange may be secured with respect to the outer spacer and positioned outwardly therefrom.

An intermediate gasket assembly may be included for use between any two filter elements which are immediately adjacent one another. This will be required between the outer filter element and an intermediate filter element as well as between an inner filter element and an intermediate filter element and will also be required between any two adjacent intermediate filter elements.

The intermediate gasket assembly itself includes a first intermediate gasket member positioned next to an adjacent filter element and a first intermediate spacer positioned within the central opening of the filter element located thereadjacent. Also a first intermediate filtration flange is secured with respect to the first intermediate gasket member and extends away from the filter element thereadjacent. A second intermediate gasket member is positioned adjacent the first intermediate gasket member and includes a second intermediate filtration flange positioned adjacent the first intermediate filtration flange and in abutting engagement therewith. A second intermediate spacer is positioned adjacent to the second intermediate filtration flange opposite from th first intermediate filtration flange. This second intermediate spacer will also be positioned extending into the central opening of the filter element located next thereadjacent.

A retainer such as a wing nut means or the like may be detachably secured with respect to the outer end of the fluid conduit such as being in threaded engagement therewith if the perforated fluid conduit is threaded in the outermost portion thereof. This retainer will be in direct abutment with respect to the outer filtration flange of the outer gasket member in such a manner as to urge the filter elements into firm abutment with respect to the gaskets thereadjacent and to selectively secure the fluid filtration apparatus with respect to the fluid conduit.

It is an object of the present invention to provide a fluid filtration apparatus wherein channeling of filtration media between individual filter elements is minimized.

It is an object of the present invention to provide a fluid filtration apparatus wherein the amount of fluid which is effectively filtered is maximized by minimizing leakage about the filter element.

It is an object of the present invention to provide a fluid filtration apparatus wherein gaskets are formed between adjacent filter elements which themselves are primarily formed of filtration media.

It is an object of the present invention to provide a fluid filtration apparatus wherein spacing means are provided for maintaining the filter elements in spaced relation with respect to the apertures defined in the fluid supplying conduit to thereby define a plenum chamber for receiving of fluid from the fluid conduit to achieve equalization of filtration throughout the area of the filter elements therearound.

It is an object of the present invention to provide a fluid filtration apparatus wherein an adjustment means is provided for veering the amount of tension between the individual filter elements and the gasket means located therebetween.

It is an object of the present invention to provide a fluid filtration apparatus wherein maintenance costs are minimized.

It is an object of the present invention to provide a fluid filtration apparatus wherein assembly of the filtration apparatus is greatly facilitated.

It is an object of the present invention to provide a fluid filtration apparatus wherein cost of removal and replacement of filter elements is minimized in financial expense and time.

It is an object of the present invention to provide a fluid filtration apparatus wherein materials cost is minimized.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
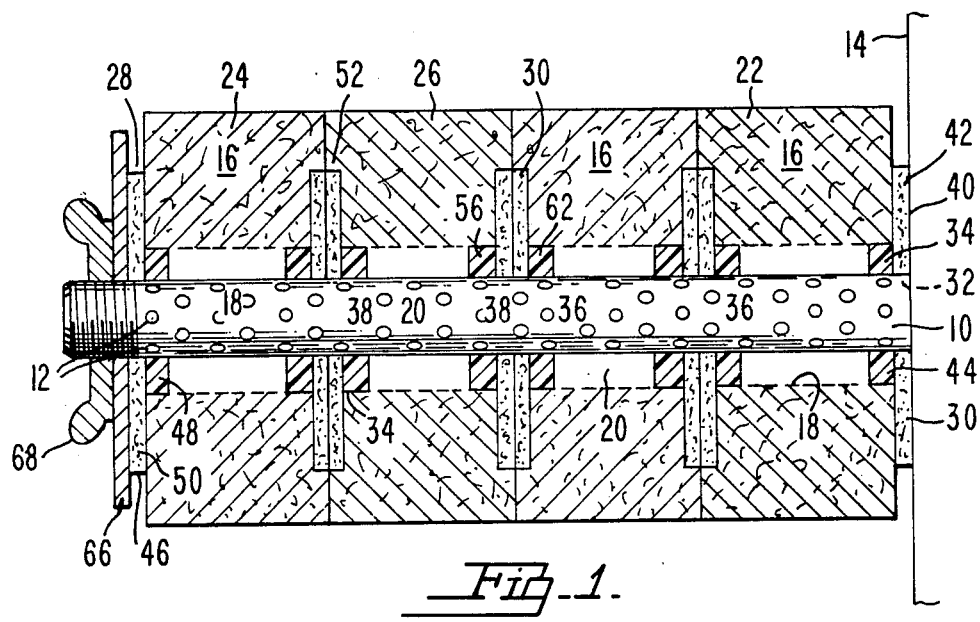
FIG. 1 is a cross-sectional view of an embodiment of the fluid filtration apparatus of the present invention shown in placed position about a perforate fluid conduit.
Figure 2:
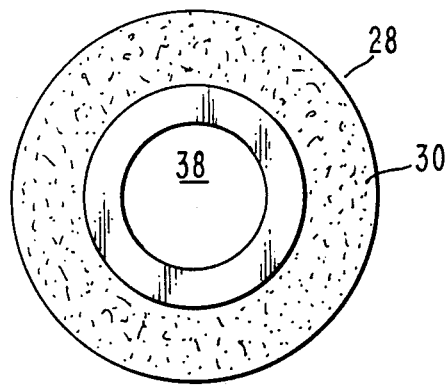
FIG. 2 is a top plan view of an embodiment of a gasket embodying a portion of the design of the present invention.
Figure 3:
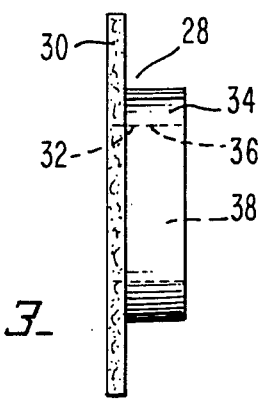
FIG. 3 is a side plan view of the embodiment shown in FIG. 2.

A fluid filtration apparatus is disclosed in the present invention which is particularly usable for the filtering of fluids immediately after passing through a perforate fluid conduit which extends outwardly from an adjacent wall area. Such a tubular conduit is normally tubular. The fluid conduit is shown in FIG. 1 as element 10. A plurality of perforations 12 are shown therearound. Fluid conduit 10 extends outwardly from the wall area 14. This construction is commonly found in apparatus used for the filtration of cleaning fluids and solvents used in cleaning of garments and other clothing.

In the filtration apparatus of the present invention a plurality of filter elements 16 are included which are generally of a cylindrical shape and include a central channel 18 extending axially therethrough. There will usually be from two to sixteen individual such filter elements 16. The central channel 18 is adapted to receive the fluid conduit 10 extending therethrough axially. Preferably the size of the central channel 18 will be sufficient enough to define an intervening space 20 therein being generally annular in shape between the outer wall of the central channel 18 and the outer wall of the fluid conduit 10.

The present invention preferably includes an inner filter element 22 positioned about the fluid conduit 10 immediately adjacent to the wall area 14. A plurality of intermediate filter elements 26 are positioned with the central channels 18 thereof extending about the fluid conduit 10 being initially adjacent to inner filter element 22 and extending outwardly therefrom. An outer filter element 24 is positioned about the outermost end of conduit 10 to complete the encirclement thereof by filtration media.

The present invention provides a plurality of gasket means 28 each of which includes a filtration flange 30 preferably formed of filtration media. Flange 30 will define a central hole 32 therein which should be approximately equal to or slightly greater than the outside diameter of conduit 10. Gasket means 28 also includes a spacing means 34 fixedly secured with respect to filtration flange 30 which includes a central aperture 36 therein equal in diameter to the diameter of central hole 32.

In this manner central hole 32 will be in registration with respect to central aperture 36 and will cooperate to define a central opening 38 extending completely through gasket means 28. Central opening 38 will be capable of receiving therein the fluid conduit 10 to facilitate mounting of the gasket means 28 about the conduit 10.

The individual gasket means 28 are positioned between each adjacent filter element 16 and are also positioned between the inner filter element 22 and in the wall area 14 as well as between the outer filter element 24 and a retainer means 26 positioned at the outermost end of the fluid conduit 10 which is positioned to retain the individual filter elements in position thereabout.

The individual gaskets 28 may include an inner gasket member 40 having an inner filtration flange 42 positioned in direct abutment with respect to wall area 14.

Filtration flange 42 may be thicker than usual or may include an additional filtration flange thereadjacent in order to create an effective filtration seal against any unusually irregular surfaces 14. Inner gasket member 40 will also include an inner spacing means 44 secured to inner filtration flange 42 on the opposite face thereof from wall 14. This inner spacing means 44 will extend into the central channel 18 defined within inner filter element 22. In this manner the central channel 18 of inner filter element 22 will be maintained concentric with respect to the tubular fluid conduit 10. This constantly maintained spaced relationship will facilitate cleaning of fluid passing through conduit 10.

An intermediate gasket assembly means 52 will be positioned between the inner filter element 22 and the next adjacent intermediate filter element 26. Also intermediate gasket assembly means 52 will be positioned between the outer filter element 24 and the intermediate filter element 26 located thereadjacent. Furthermore the intermediate gasket assembly means 52 will be positioned between adjacent intermediate filter elements 26. Thus we see that the intermediate gasket assembly means 52 is used whenever two filter elements are adjacent to one another.

The intermediate gasket assembly means includes a first intermediate gasket member 54 with a first intermediate spacing means 56 positioned extending into one of the adjacent filter elements. A first intermediate filtration flange 50 is secured with respect to the intermediate spacing means immediately adjacent to that filter element. A second intermediate gasket member 60 is positioned with the second intermediate spacing means 62 thereof extending into the central channel 18 of the other adjacent filter element. The second intermediate filtration flange 64 will be secured to the second intermediate spacing means 62 in such a manner that the first intermediate filtration flange 58 and the second intermediate filtration flange 64 of the intermediate gasket assembly means 52 will be in direct abutment with respect to one another to form a secure seal and maintain the integrity of filtration in the joint between adjacent filter elements 16.

The outer edge of outer filter element 24 will have positioned thereadjacent an outer gasket member 46. Outer gasket member 46 will include an outer spacing means 48 extending into the central channel 18 of filter element 16. Outer filtration flange 50 will be secured with respect to outer spacing means 48 in such a manner as to abut the outermost edge of outer filter element 24. This outer filtration flange 50 will be in position between the retainer plate means 66 and the outer filter element 24 to maintain the filtration integrity therebetween and minimize the escape of fluid thereby without requiring passage through filtration media.

To facilitate securement of the entire overall filtration apparatus the retainer plate means 66 is selectively compressible inwardly toward the wall area 14. This is preferably achieved by internal diameter threading of a wing nut 68 with complementary external threading of the fluid conduit 10 adjacent the outermost end thereof. To facilitate tightening of retainer plate means 66 the wing nut means 68 may be positioned adjacent said retainer plate means 66 and outwardly therefrom to provide leverage for tightening thereagainst.

The final overall filtration structure of the present invention provides a means for eliminating channeling and other escape of fluid to be filtered between adjacent filter elements and between filter elements and adjacent environmental structures. The present invention provides a gasket member being formed partially of filtration media which is positioned between every interface between filter elements and environmental structure or between filter elements and adjacent filter elements in such a manner as to maximize fluid filtration.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A fluid filtration apparatus, being usable with a perforate fluid conduit extending outwardly from an adjacent wall area, which comprises:
  (a) a plurality of filter elements formed of filtration media and defining a central channel extending therethrough, said central channel being adapted to receive the perforate fluid conduit extending therethrough, said central channel being larger than the perforate fluid conduit to define an intervening space therebetween, said filter elements further including:
    (1) an inner filter element positioned about the fluid conduit and located adjacent to the wall area;
    (2) an outer filter element positioned about the fluid conduit and located adjacent to the outer end of the fluid conduit;
    (3) at least one intermediate filter element positioned about the fluid conduit and located between said inner filter element and said outer filter element;
  (b) a plurality of gasket means positioned adjacent said filter elements to prevent bypassing flow of fluid adjacent said filter elements, each of said gasket means comprising a filtration flange defining a central hole adapted to receive the fluid conduit extending therethrough and a spacing means secured with respect to said filtration flange, said spacing means defining a central aperture therein in registration with respect to said central hole to also be adapted to receive the fluid conduit extending therethrough, said central hole and said central aperture together defining a central opening through said gasket means, said intervening space of said filter elements being large enough to receive said spacing means therein, each of said gasket means further comprising:
    (1) an inner gasket member positioned between said inner filter element and the adjacent wall area and with said central opening thereof extending about said perforate fluid conduit, said inner gasket member including:
      (a) an inner filtration flange in abutment with respect to the adjacent wall area, and
      (b) an inner spacing means positioned within said intervening space of said inner filter element to maintain said inner filter means in spaced relation with respect to the perforate fluid conduit;
    (2) an outer gasket member positioned outside said outer filter element with said central opening thereof extending about said perforate fluid conduit, said outer gasket member including:
      (a) an outer spacing means positioned within said intervening space of said outer filter element to maintain said outer filter means in spaced relation with respect to the perforate fluid conduit;

(b) an outer filtration flange secured with respect to said outer spacing means and positioned outwardly therefrom;

(3) an intermediate gasket assembly means, positioned between said outer filter element and said intermediate filter element, between said inner filter element and said intermediate filter element and between any adjacent of said intermediate filter elements, said intermediate gasket assembly means comprising:

(a) a first intermediate gasket member positioned next to an adjacent filter element, said first intermediate gasket member including:

(i) a first intermediate spacing means positioned within said central opening of said filter element located thereadjacent;

(ii) a first intermediate filtration flange secured to said first intermediate gasket member and extending away from said filter element thereadjacent;

(b) a second intermediate gasket member positioned adjacent said first intermediate gasket member and further including:

(i) a second intermediate filtration flange positioned adjacent said first intermediate filtration flange and in direct abutment therewith;

(ii) a second intermediate spacing means secured to said second intermediate filtration flange opposite from said first intermediate filtration flange, said second intermediate spacing means positioned extending into said central opening of said filter element located next thereadjacent; and (c) retainer means detachably securable with respect to the outer end of the perforate fluid conduit in direct abutment with respect to said outer filtration flange of said outer gasket member to urge each of said filter elements into firm abutment with respect to said gasket means thereadjacent and to selectively secure the fluid filtration apparatus with respect to the perforate fluid conduit.

2. A fluid filtration apparatus as usable with a perforate fluid conduit as defined in claim 1 wherein the outer end of the fluid conduit is externally threaded and said retainer means includes a wing nut means adapted to thread thereon.

3. A fluid filtration apparatus usable with a perforate fluid conduit as defined in claim 1 wherein said retainer means is adjustable inwardly along the fluid conduit toward said filter element to urge said gasket means into abutting and sealing contact with respect to said filter elements.

4. A fluid filtration apparatus usable with a perforate fluid conduit as defined in claim 1 wherein the inside diameter of said central apertures of said spacing means is between 1⅜ and 2⅛ inches.

5. A fluid filtration apparatus usable with a perforate fluid conduit as defined in claim 1 wherein said central opening of said gasket means is maintained axially concentric with respect to the fluid conduit by said spacing means adjacent said gasket means.

6. A fluid filtration apparatus usable with a perforate fluid conduit as defined in claim 1 wherein said spacing means are annular in cross-section.

7. A fluid filtration apparatus usable with a perforate fluid conduit as defined in claim 1 wherein said filtration flanges are annular in cross-section.

8. A fluid filtration apparatus usable with a perforate fluid conduit as defined in claim 1 wherein said filter elements are annular in cross-section.

9. A fluid filtration apparatus usable with a perforate fluid conduit as defined in claim 1 wherein said retainer means includes tab means thereon to facilitate tightening thereof.

10. A fluid filtration apparatus usable with a perforate fluid conduit as defined in claim 1 wherein said intervening space between said filter element and the fluid conduit comprises a plenum chamber to receive fluid to be filtered from the conduit for equal distribution thereof along said filter element to facilitate cleansing thereof.

11. A fluid filtration apparatus usable with a perforate fluid conduit as defined in claim 1 wherein said filtration flange of said gasket means is made of filtration media.

12. A fluid filtration apparatus usable with a perforate fluid conduit as defined in claim 1 wherein the outside diameter of said filtration flange is less than the outside diameter of said filter element.

13. A fluid filtration apparatus usable with a perforate fluid conduit as defined in claim 1 wherein the outside diameter of said filtration flange is equal to the outside diameter of said filter element.

14. A fluid filtration apparatus, being usable with a tubular perforate fluid conduit extending outwardly from an adjacent wall area, which comprises:

(a) a plurality of filter elements formed of filtration media and defining a cylindrical central channel extending therethrough, said central channel being adapted to receive the tubular perforate fluid conduit extending therethrough with said central channel being concentric with respect thereto, said central channel being larger than the perforate fluid conduit to define an annular intervening space therebetween, said intervening space between said filter element and the fluid conduit comprising a plenum chamber to receive fluid to be filtered from the conduit for equal distribution thereof along said filter element to facilitate cleansing thereof, said filter elements further including:

(1) an inner filter element positioned about the fluid conduit and located adjacent to the wall area;

(2) an outer filter element positioned about the fluid conduit and located adjacent to the outer end of the fluid conduit;

(3) at least one intermediate filter element positioned about the fluid conduit and located between said inner filter element and said outer filter element;

(b) a plurality of gasket means positioned adjacent said filter elements to prevent bypassing flow of fluid adjacent said filter elements, each of said gasket means comprising a filtration flange of filtration media defining a central hole of between one and five eighths to two and one eighth inches in diameter and being adapted to receive the fluid conduit extending therethrough and an annular spacing means secured with respect to said filtration flange, said spacing means defining a central aperture therein of between one and five eighths to two and one eighth inches in diameter and being in registration with respect to said central hole to also be adapted to receive the fluid conduit extending therethrough, said central hole and said central aperture together defining a central opening through said gasket means, said intervening space of said filter elements being large enough to receive said annular spacing means therein, each of said gasket means further comprising:
(1) an inner gasket member positioned between said inner filter element and the adjacent wall area and with said central opening thereof extending about said perforate fluid conduit, said inner gasket member including:
   (a) an inner filtration flange in abutment with respect to the adjacent wall area; and
   (b) an inner spacing means positioned within said intervening space of said inner filter element to maintain said inner filter means in spaced relation with respect to the perforate fluid conduit;
(2) an outer gasket member positioned outside of the outermost said filter element with said central opening thereof extending about said perforate fluid conduit, said outer gasket member including:
   (a) an outer spacing means positioned within said intervening space of said outer filter element to maintain said outer filter means in spaced relation with respect to the perforate fluid conduit;
   (b) an outer filtration flange secured with respect to said outer spacing means and positioned outwardly therefrom;
(3) an intermediate gasket assembly means, positioned between said outer filter element and said intermediate filter element, between said inner filter element and said intermediate filter element and between any adjacent of said intermediate filter elements, said intermediate gasket assembly means comprising:
   (a) a first intermediate gasket member positioned next to an adjacent filter element, said first intermediate gasket member including:
      (i) a first intermediate spacing means positioned within said central opening of said filter element located thereadjacent;
      (ii) a first intermediate filtration flange secured to said first intermediate gasket member and extending away from said filter element thereadjacent;
   (b) a second intermediate gasket member positioned adjacent said first intermediate gasket member and further including:
      (i) a second intermediate filtration flange positioned adjacent said first intermediate filtration flange and in direct abutment therewith;
      (ii) a second intermediate spacing means secured to said second intermediate filtration flange opposite from said first intermediate filtration flange, said second intermediate spacing means positioned extending into said central opening of said filter element located next thereadjacent; and
   (c) retainer means detachably threadably engageable with respect to the outer end of the perforate fluid conduit and in direct abutment with respect to said outer filtration flange of said outer gasket member to selectively secure the fluid filtration apparatus with respect to the perforate fluid conduit, said retainer nut means being inwardly adjustable toward said filter elements to urge each of said filter elements into firm abutment with respect to said gasket means thereadjacent, said retainer means including tab means thereon extending outwardly therefrom to facilitate tightening thereof.

* * * * *